(12) United States Patent
Walker

(10) Patent No.: US 7,673,698 B2
(45) Date of Patent: Mar. 9, 2010

(54) PERFECT PLANTING TOOL

(76) Inventor: Nolan Eugene Walker, 2820 Broad Mead Dr., Apt 713, Houston, TX (US) 77025

(*) Notice: Subject to any disclaimer, the term of this patent is extended or adjusted under 35 U.S.C. 154(b) by 0 days.

(21) Appl. No.: 12/154,770

(22) Filed: May 27, 2008

(65) Prior Publication Data

US 2009/0294143 A1 Dec. 3, 2009

(51) Int. Cl.
*A01B 1/16* (2006.01)
*A01B 45/02* (2006.01)

(52) U.S. Cl. .................. 172/378; 111/106

(58) Field of Classification Search ............. 172/21, 172/22, 378, 548, 375, 371; 111/92, 101, 111/106; 294/50.5–50.9, 53.5, 55, 57, 68.23, 294/115
See application file for complete search history.

(56) References Cited

U.S. PATENT DOCUMENTS

| | | | | |
|---|---|---|---|---|
| 182,367 A * | 9/1876 | Jones | ...................... | 111/101 |
| 1,212,303 A * | 1/1917 | Wilt | ...................... | 294/100 |
| 1,443,138 A * | 1/1923 | Littley | ...................... | 294/50.8 |
| 1,778,701 A * | 10/1930 | Williams | ...................... | 111/108 |
| 1,888,929 A * | 11/1932 | McDowell | ...................... | 294/50.8 |
| 4,165,697 A * | 8/1979 | Yeager et al. | ...................... | 111/92 |
| 4,694,760 A * | 9/1987 | Camp | ...................... | 111/92 |
| 4,706,582 A * | 11/1987 | Keskilohko | ...................... | 111/106 |
| 5,154,465 A * | 10/1992 | Pakosh | ...................... | 294/50.8 |
| 5,273,331 A * | 12/1993 | Burnham | ...................... | 294/50.8 |
| 6,338,512 B1 * | 1/2002 | Ruppert et al. | ...................... | 294/50.8 |
| 6,349,776 B1 * | 2/2002 | Hus | ...................... | 172/375 |

* cited by examiner

*Primary Examiner*—Robert E Pezzuto
(74) *Attorney, Agent, or Firm*—DelPhine James

(57) ABSTRACT

A gardening hand tool for digging holes is provided. The tool further comprises a pair of shovel blades aligned parallel to each other and are pivotally attached to the bottom of a shaft member. A handle is attached to the upper end of a shaft member and is pivotally connected to the shovel blades.

5 Claims, 5 Drawing Sheets

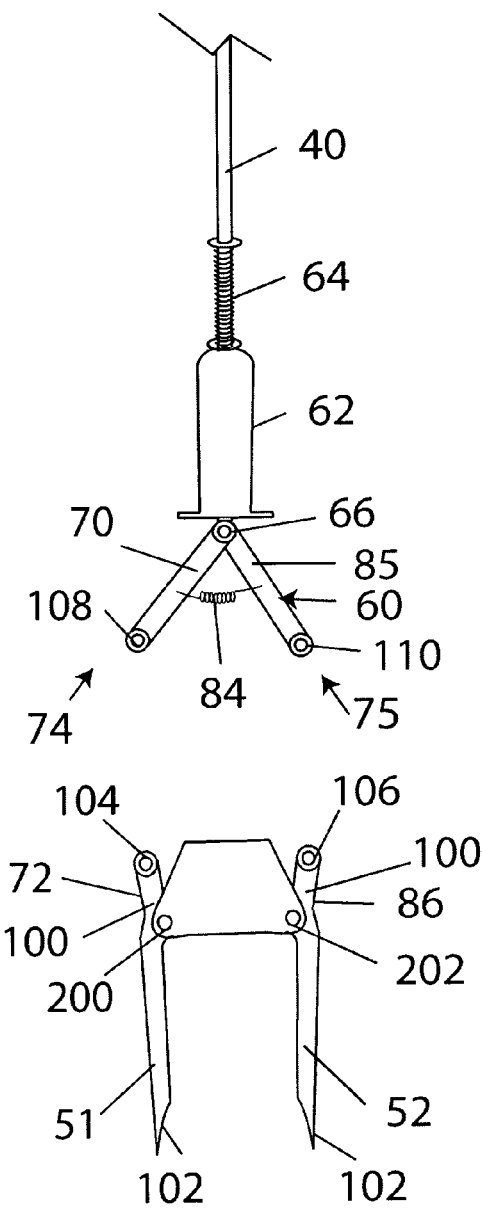
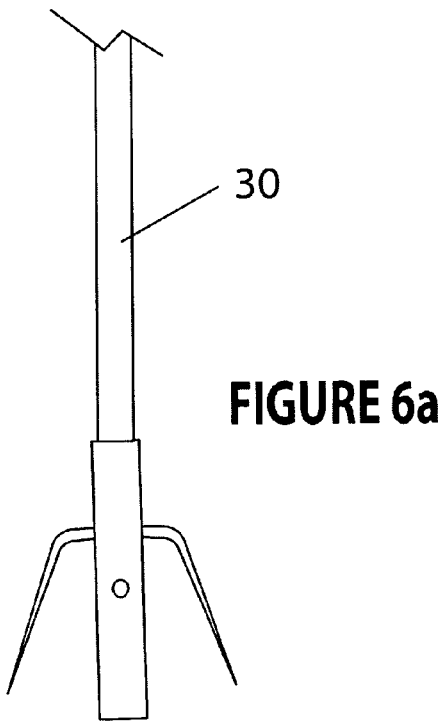
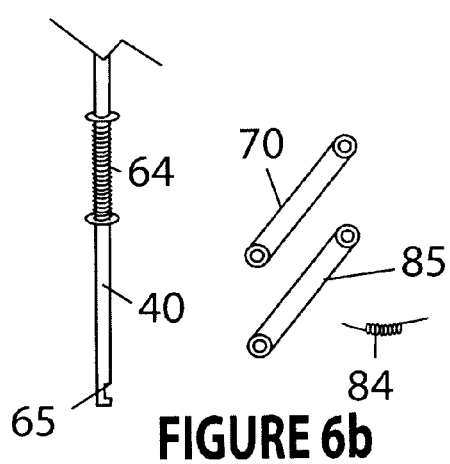
FIGURE 6
FIGURE 6a
FIGURE 6b

PERFECT PLANTING TOOL

BACKGROUND OF INVENTION

The present invention related to manual hand gardening tools. In particular, the present invention relates to a tool for digging holes for plants. Many types of gardening as well as post hole digger tools are disclosed in the prior art. For example, U.S. Pat. No. 6,386,294 disclose a hole making system. U.S. Pat. No. 5,320,363 discloses a post hole digger with shaft assembly with a pair of shoveling blades attached to the bottom thereto. However, the present invention discloses a uniquely designed gardening tool.

SUMMARY OF THE INVENTION

It is an object of the present invention to produce an improved gardening tool which allows a person to plant seedlings without bending, stooping and kneeling.

Accordingly, the present invention is a gardening hand tool for digging holes. The tool further comprises a pair of shovel blades aligned parallel to each other and are pivotally attached to the bottom of a shaft member. A handle is attached to the upper end of a shaft member and is pivotally connected to the shovel blades.

Other features and advantages of the present invention will be apparent to those skilled in the art from reading the specifications in conjunction with the drawings.

BRIEF DESCRIPTION OF THE DRAWINGS

In the drawings,

FIG. 6 is an exploded bottom side view with shovel removed.

FIG. 6A is an exploded bottom side view.

FIG. 6B is an exploded disassembled view of the rod member.

DETAILED DESCRIPTION OF PREFERRED EMBODIMENTS

Figure 1:
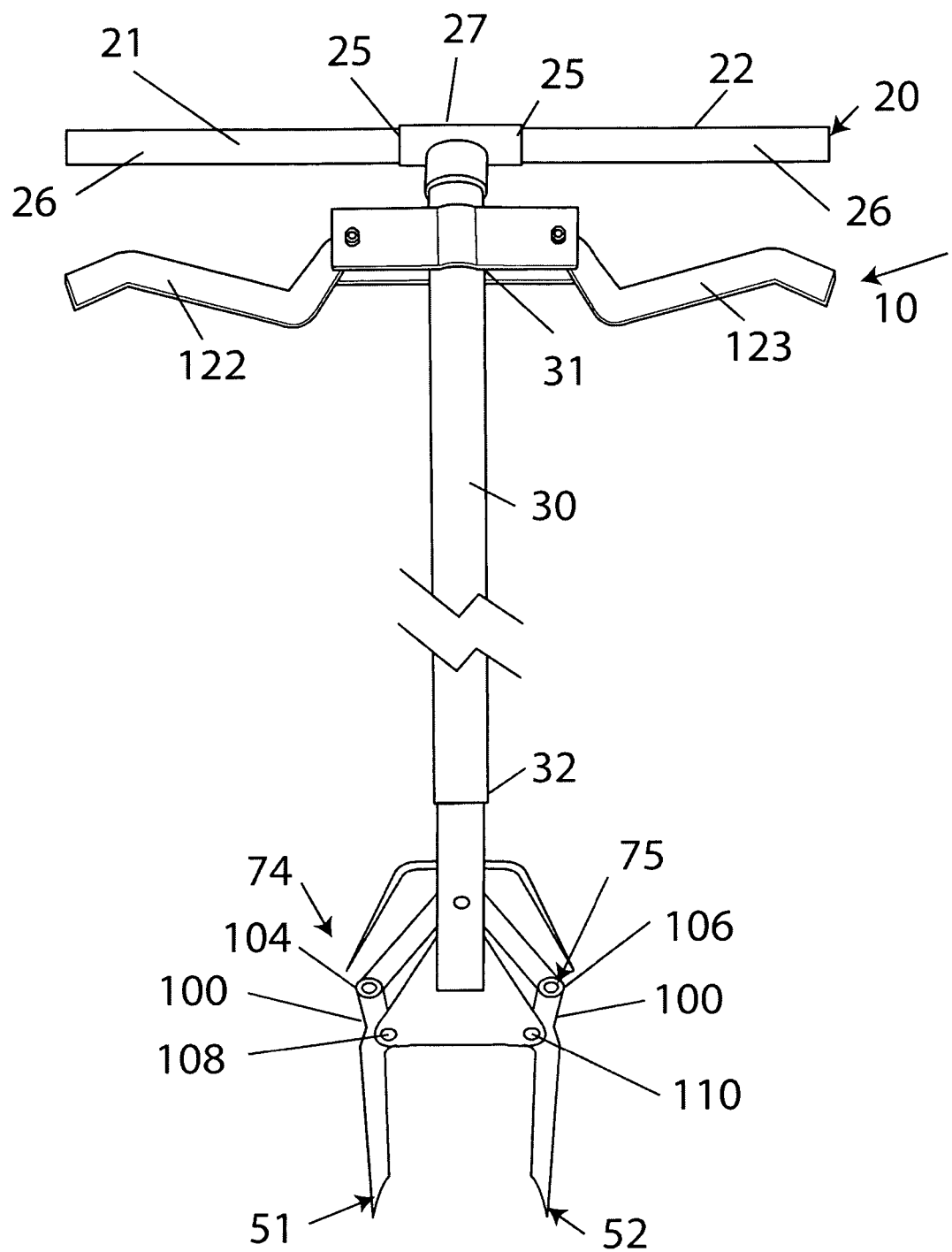
FIG. 1 is a front perspective view of the present invention a gardening tool.

Referring now to FIG. 1, there is shown a front perspective view of gardening tool 10. Gardening tool 10 further comprises a handle assembly 20, a hollow shaft member 30, and a pair of shovel blades (51, 52).

Hollow shaft member 30 is further defined by an upper end 31 and a lower end 32. Handle assembly 20 extends laterally across and is perpendicularly mounted upon the upper end 31 of hollow shaft member 30. Handle assembly is defined by a left section 21 and a right section 22 with T shape connector 27 centrally disposed therebetween. Right section 22 and left section 21 of handle assembly 20 both are further defined by an inner side 25 and opposite outer side 26.

Figure 2:
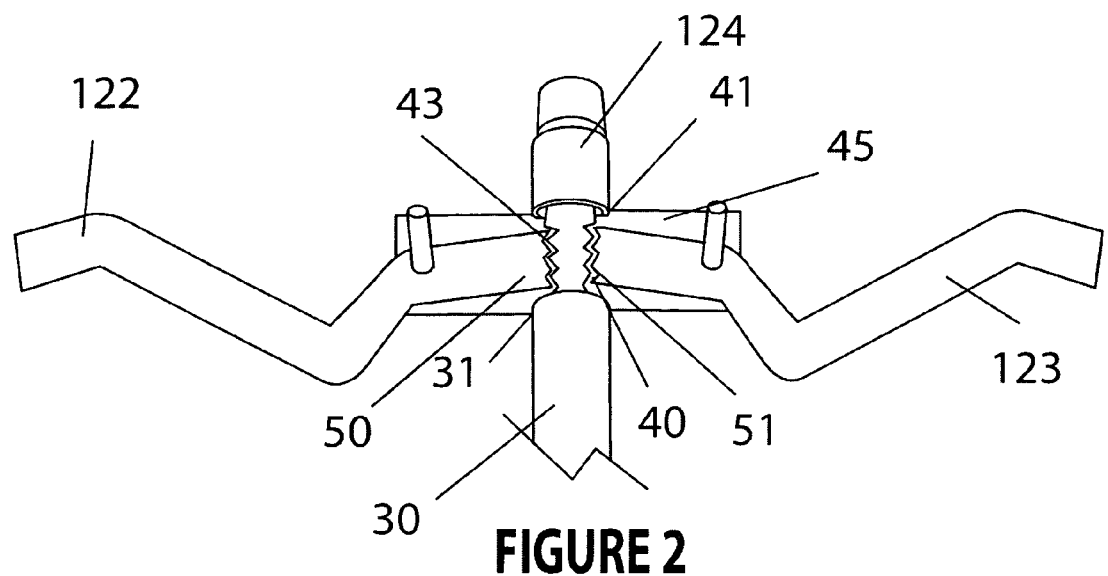
FIG. 2 an exploded top view of the handle and gear assembly.
Figure 3:
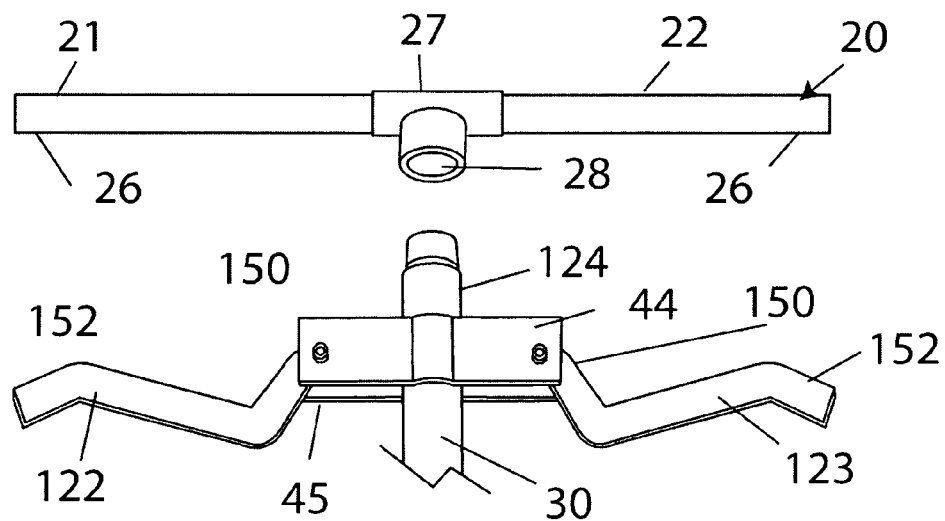
FIG. 3 is an exploded top view with handle removed.
Figure 4:
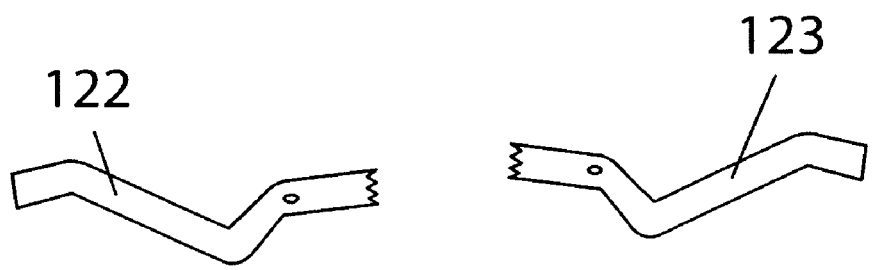
FIG. 4 is a view of the levers disassembled.
Figure 5:
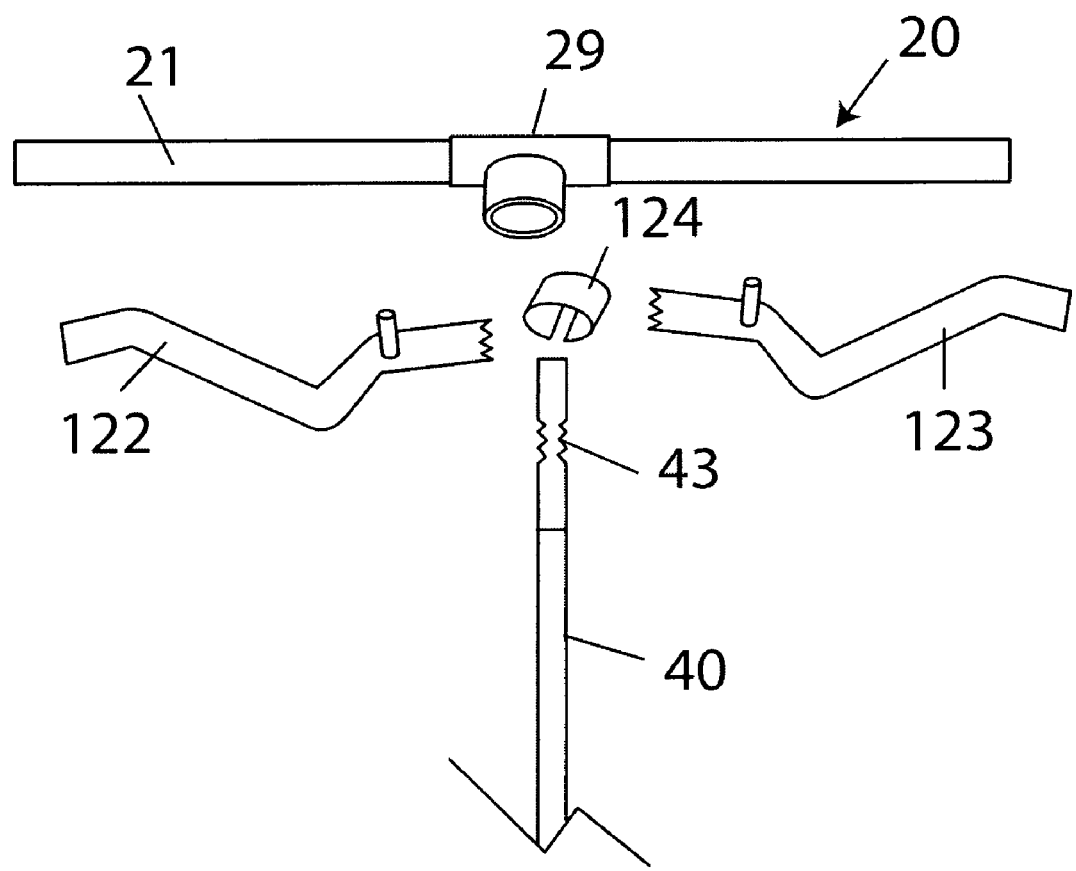
FIG. 5 is an exploded handle and levers.

Referring to FIGS. 2 and 3, in the present invention, rod member 40 is inserted into hollow shaft member 30. Rod member 40 is slidably engaged within hollow shaft member 30 and extends above the upper end 31 of hollow shaft member 30. Attached to the upper end 41 of rod member 40 is gear assembly 43 that extends above the upper end 31 of hollow shaft member 30.

As shown in FIG. 3, front guide support 44 and back guide support 45 are coupled together to encapsulate gear assembly 43. Each guide support member (44, 45 is equivalent in size and shape. In the preferred embodiment, each guide support member (44, 45) is made of a rectangular shape bar member having a length extending the distance from inner side 50 of lever 122 to inner side 57 of lever 123.

As shown in FIG. 2 and FIG. 3, a pair of levers, (122, 123) are horizontally mounted below handle assembly 20. Each lever (122, 123) is defined by inner side 50 and opposing outer side 51. As shown, the inner side 150 of each lever (122, 123) is adapted to pivotally engage into the gear assembly 43 such that gear assembly 43 is disposed between lever 122 and lever 123. The outer side 152 of each lever (122, 123) is respectively situated below outer side 26 of each section (21, 22) of handle assembly 20. As shown gear assembly 43 is disposed between the pair of levers (122, 123). As shown in FIG. 3, T-shape connector 27 has an opening 28 which is securely coupled to cover 124 that is adapted to slide over the exposed the gear assembly 43. Front and back guide support members (44, 45) are situated below handle assembly 20.

As shown in FIG. 6, coupled to the lower end of rod member 40 is triangular joint member 60. Situated above triangular joint member 60 is cylindrical disc 62 which encircles the lower end of rod member 40. As shown in FIG. 6A, rod member 40 is enclosed within the lower end of shaft member 30.

As shown in FIG. 6, cylindrical disc 62 has a bore that slides upon rod member 40. Disposed above cylindrical disc 62 is tension spring 64 which encircles the area of the rod member 40 above cylindrical disc 62. As shown in FIG. 6, the lower end of rod 40 is adapted to cooperatively engage with triangular joint member 66.

As shown in FIG. 6, the movement of the pair of shovels (left shovel 51, right shovel 52 is respectively activated by a pair of compound joints (left compound joint 74, right compound joint 75). The pair of compound joints (74, 75) is controlled by the movement of triangular joint member 66. The left compound joint 74 is formed by an upper brace 70 and a lower brace 72. As depicted in FIG. 6, the right compound joint 75 is formed by upper brace 85 and lower brace 86. The lower end of rod member 40 is pivotally attached to triangular joint member 66. Upper end of the left upper brace 70 is adjoined to the upper end of the right upper brace 85 forming the apex of triangular joint member 66. Compression spring 84 is mounted between left upper brace 70 and right upper brace 85 allowing back and forth motion between the left upper brace 70 and right upper brace 85.

Figure 8:
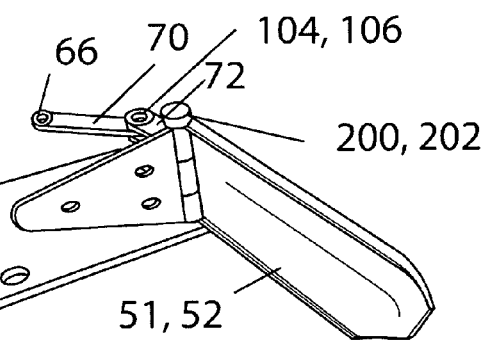
FIG. 8 is an exploded side view of the shovel member.
Figure 8A:
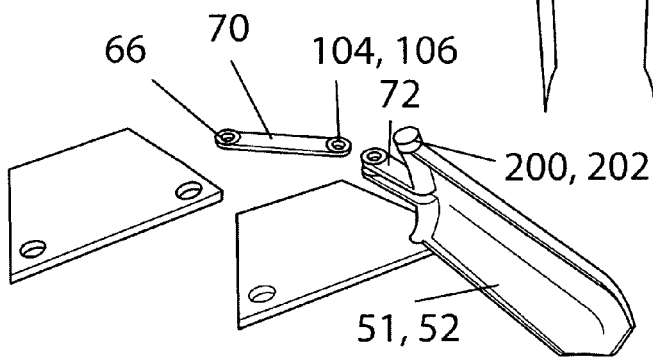
FIG. 8a an exploded side view of an alternative embodiment of the shovel member
Figure 8A:
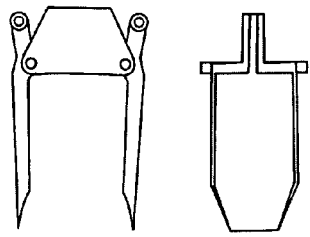

As shown in FIG. 6, left shovel blade 51 and right shovel blade, 52 are aligned parallel relation to each other and are pivotally coupled to the lower end of rod member 40 situated within the hollow shaft member 30. Each shovel blade (51, 52) is defined by an upper end 100 and a lower end 102. Lower end 102 of each blade (51, 52) faces downward toward the ground. As shown in FIG. 8 and FIG. 8a, the upper end 100 of each blade (51, 52) has a hinged connection (200, 202) connected thereto.

As shown in FIG. 6 and FIG. 8a, in one embodiment of shovel blade (51, 52) respective connections, opposing left lower brace and right lower brace (72, 86) are formed respectively within the upper portion of left shovel blade 51 and right shovel blade 52. Pivoting connections 104 and 106 are integrated and respectively formed within the upper end of each lower brace (72, 86) which respectively extends into the upper end 100 of each shovel blade (51, 52).

Figure 7:
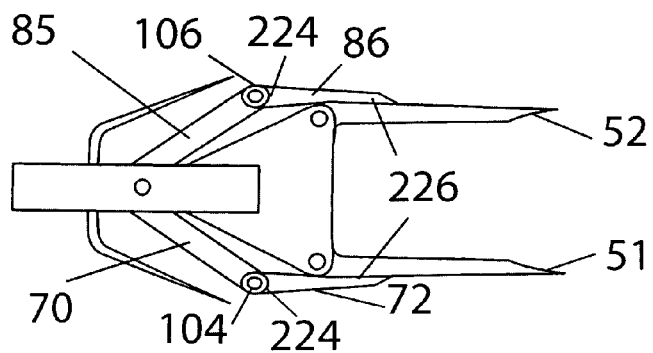
FIG. 7 is an exploded view of frontal view of the shovel member.

In an alternative embodiment of shovel blade (51, 52) respective connections, as shown in FIG. 7 and FIG. 8, opposing left lower brace 72 and right lower brace 86 are separate and are respectively coupled to the outer surface of left shovel 51 and right shovel 52. Each lower brace (72, 86) is further defined by an upper end 224 and a lower end 226. The upper end of each lower brace (72, 86) are coupled to the lower end of each upper brace (70, 85) via pivoting connection (104, 106). As depicted, upper brace (70, 72) and lower brace (85, 86) are separate components. Additionally, hinge connection (200, 202) is a separate conventional hinge component.

In use, referring to FIG. 1, FIG. 2, and FIG. 3 when the pair of levers (122, 123) is pulled upward, the upper end of the rod member 40 extends above the hollow shaft member 30. As the pair of levers (122, 123) is pulled upward, tension spring 64 compresses to exert force upon cylindrical disc 62. As force is exerted upon cylindrical disc 62, left upper brace 70 and right upper brace 72 are forced to compress towards each other. As left upper brace 70 and right upper brace 72 are compressed, left lower brace and right lower brace respectively force pivoting connection 104 and 106 to expand outward forcing left blade 50 and right blade 52 to contract towards each other. As the levers are released, the left blade 50 and right blade 52 automatically retracts outward. Thus, an operator, determine where within the ground to plant a seedling. Next, the operator pushes the blades (50, 52) into the ground to dig a hole with tool 10. Next, the levers (122, 123) are pulled upward to contract left blades 50 towards right blade 52. While blades 50,52 are contracted the dirt is uplift forming a hole for the seedling.

To insert the seedling into the hole, the operator pushes the seedling between blades (50, 52). Next, the levers (122, 123) are pulled upward to contract left blades 50 towards right blade 52. While blades 50, 52 are contracted the seedling is placed into the hole without bending or stooping.

What is claimed is:

1. A gardening tool comprising:
   a hollow shaft member defined by a top end and a lower end;
   a rod member defined by a top end and a lower end;
   the rod member slidably engaged within the hollow shaft member;
   a gear assembly disposed atop the rod member and extending above the top end of the hollow shaft member;
   a compression means disposed at the lower end of the rod member within the lower end of the hollow shaft member;
   a handle assembly defined by a T-shape connector sandwiched between a left section and a right section;
   the T-connector disposed atop the hollow shaft member and securely coupled thereto in a perpendicular relation;
   a left lever situated below the left section of the handle assembly having an inner side cooperatively engaged with the gear assembly;
   a right lever situated below the right section of the handle assembly having an inner side cooperatively engaged with the gear assembly;
   a front guide support member and a back guide support member encapsulating the gear assembly;
   a left shovel aligned in a parallel relation with a right shovel; the left and right shovel each defined by an upper end and a lower end;
   a left hinge connected to the upper end of the left shovel;
   a right hinge connected to the upper end of the right shovel;
   the compression means cooperatively coupled to the left hinge and the right hinge wherein as the left lever and right lever are pulled upward the left shovel and right shovel contract towards each other; and
   as the left lever and right lever are released the left shovel and right shovel automatically retracts away from each other.

2. The tool of claim 1 wherein the compression means further comprises:
   a spring member encircling the lower end of the rod member within the lower end of the hollow shaft member;
   a cylindrical disc encircling the lower end of the rod member below the spring member within the lower end of the hollow shaft member.

3. The tool of claim 1 further comprising:
   the right and left lever each having an inner side and an opposing outer side
   the front and back guide each having an inner side and an opposing outer side
   the gear assembly disposed between the inner side of the of the left lever and the right lever; and
   the inner side of the left and the right lever having gear means that cooperatively engaged with the gear assembly such that as the left lever and right lever are pulled upward the left shovel and right shovel contract towards each other; and
   as the left lever and right lever are released the left shovel and right shovel automatically retracts away from each other.

4. The tool of claim 1 further comprising:
   a left compound joint and a right compound joint;
   the left compound joint formed by an upper brace defined by an upper end and a lower end and a lower brace; defined by an upper end and a lower end
   the right compound joint formed by an upper brace defined by an upper end and a lower end and a lower brace defined by an upper end and a lower end;
   the upper end of the upper brace of the left compound joint and the upper end of the upper brace of the right compound joint forming a triangular connection;
   the triangular connection being pivotally connected to the lower end of the rod member;
   the lower end of the upper brace of the left compound joint being pivotally connected to the upper end of the lower brace of the left compound joint;
   the lower end of the upper brace of the right compound joint being pivotally connected to the upper end of the lower brace of the right compound joint;
   the lower end of the lower brace of the left compound joint being formed within the upper end of the left shovel; and
   the lower end of the lower brace of the right compound joint being formed within the upper end of the right shovel.

5. The tool of claim 1 further comprising:
   a left compound joint and a right compound joint;
   the left compound joint formed by an upper brace defined by an upper end and a lower end and a lower brace; defined by an upper end and a lower end
   the right compound joint formed by an upper brace defined by an upper end and a lower end and a lower brace defined by an upper end and a lower end;
   the upper end of the upper brace of the left compound joint and the upper end of the upper brace of the right compound joint forming a triangular connection;
   the triangular connection being pivotally connected to the lower end of the rod member;

the lower end of the upper brace of the left compound joint being pivotally connected to the upper end of the lower brace of the left compound joint;

the lower end of the upper brace of the right compound joint being pivotally connected to the upper end of the lower brace of the right compound joint;

the lower end of the lower brace of the left compound joint couplet to the upper end of the left shovel; and the lower end of the lower brace of the right compound joint coupled to the upper end of the right shovel.

\* \* \* \* \*